United States Patent [19]

Kothmann

[11] 3,759,548

[45] Sept. 18, 1973

[54] SAFETY TRAILER HITCH
[76] Inventor: Gilbert C. Kothmann, P.O. Box 680, Mason, Tex. 76856
[22] Filed: Nov. 19, 1971
[21] Appl. No.: 200,476

Related U.S. Application Data
[63] Continuation-in-part of Ser. No. 23,373, March 27, 1970, Pat. No. 3,677,564.

[52] U.S. Cl. ............................................... 280/511
[51] Int. Cl. .............................................. B60d 1/12
[58] Field of Search ........................... 280/511, 507

[56] References Cited
UNITED STATES PATENTS
3,522,958 8/1970 Lusignan ............................ 280/507
3,605,457 9/1971 Foster ................................ 280/507
3,047,839 7/1962 Brown ................................ 280/507

*Primary Examiner*—Robert R. Song
*Attorney*—Berman, Davidson & Berman

[57] ABSTRACT

A safety trailer hitch in which a ball is mounted on the towing vehicle and a ball clamping coupling is mounted on the trailing vehicle. A member carrying a finger is arranged on the towing vehicle to be positioned with the finger overlying the coupling to prevent the coupling from detaching from the ball even if unlocked. The finger is mounted to be swung out of the way as required to permit the coupling to be disconnected from the ball.

In a modified form of the invention a yoke is mounted on the towing vehicle for swinging to a position overlying the coupling to prevent the coupling from being detached from the ball.

3 Claims, 5 Drawing Figures

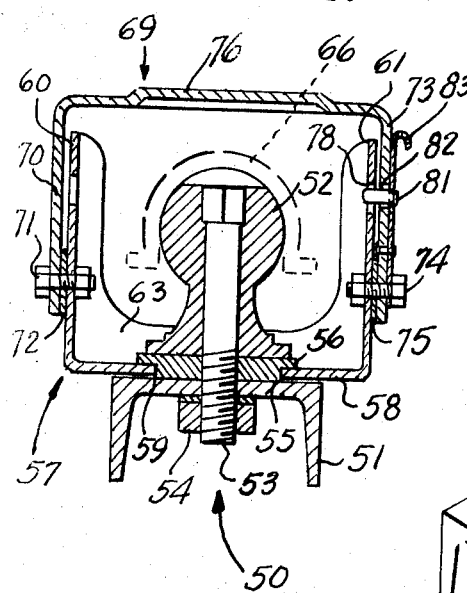
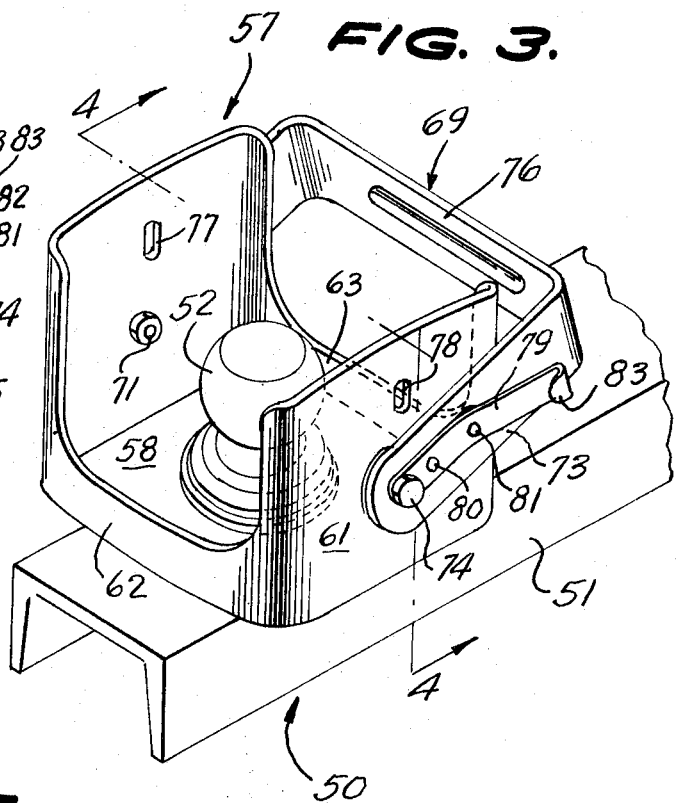
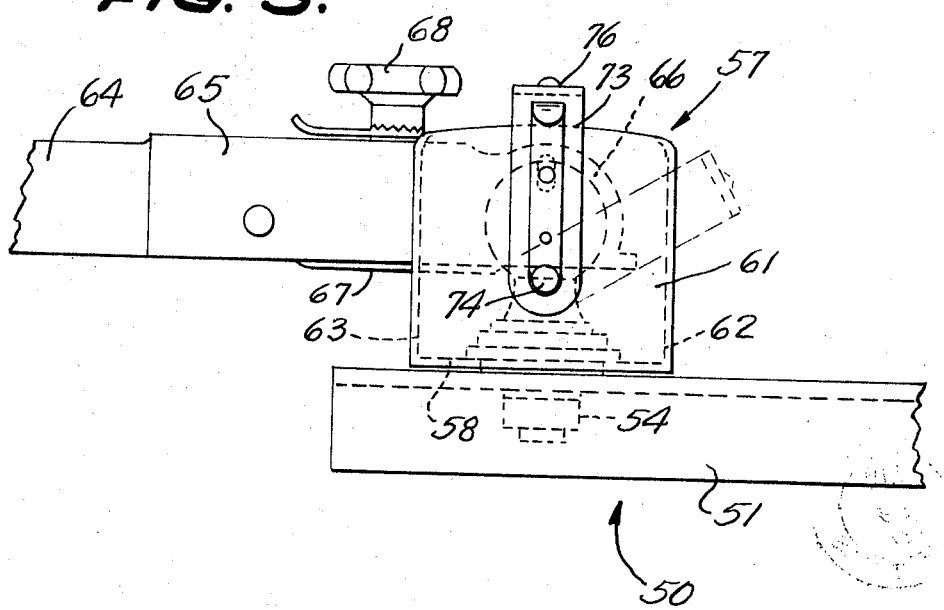

SAFETY TRAILER HITCH

CROSS REFERENCE TO RELATED APPLICATION

This application is a continuation-in-part of my co-pending application Ser. No. 23,373, filed Mar. 27, 1970 entitled "Safety Trailer Hitch", now U.S. Pat. No. 3,677,564.

BACKGROUND OF THE INVENTION

1. Field of the Invention

The present invention relates to safety trailer hitches of the type normally used to tow boat trailers, utility trailers, camping trailers, and the like with a passenger automobile or light truck.

2. Description of the Prior Art

In prior art devices it has been normal to use safety chains between the trailing and towing vehicles, to maintain the alignment of the trailing vehicle with the towing vehicle, should the coupling become disconnected from the ball. A considerable amount of slack is required in the chains to permit the normal swiveling action of the trailer and this slack creates problems when the hitch breaks or becomes disconnected and the only connection between the trailer and the towing vehicle is the chains. The trailer is then permitted to whip from side to side due to the slack in the chains and many wrecks have been traced to this whipping action which caused the driver of the towing vehicle to lose control of the car.

SUMMARY OF THE INVENTION

The present invention includes a finger mounted on the towing vehicle and arranged to be releasably positioned to overlie the trailer coupling to prevent it from being disengaged from the ball accidentally.

In a modified form of the invention a yoke is mounted on the towing vehicle and is arranged to swing to a position overlying the coupling and ball to prevent the coupling from being detached from the ball accidentally.

The primary object of the invention is to provide a safety trailer hitch for maintaining the safe coupling of a trailer with its towing vehicle in the event the normal coupling becomes unlocked.

Other objects and advantages will become apparent in the following specification when considered in light of the attached drawings.

BRIEF DESCRIPTION OF THE DRAWINGS

FIG. 3 is a perspective view of a modified form of the invention;

FIG. 4 is a transverse vertical sectional view taken along the line 4—4, of FIG. 3, looking in the direction of the arrows; and FIG. 5 is a side elevation of the structure illustrated in FIG. 3.

DESCRIPTION OF THE PREFERRED EMBODIMENTS

Figure 1:
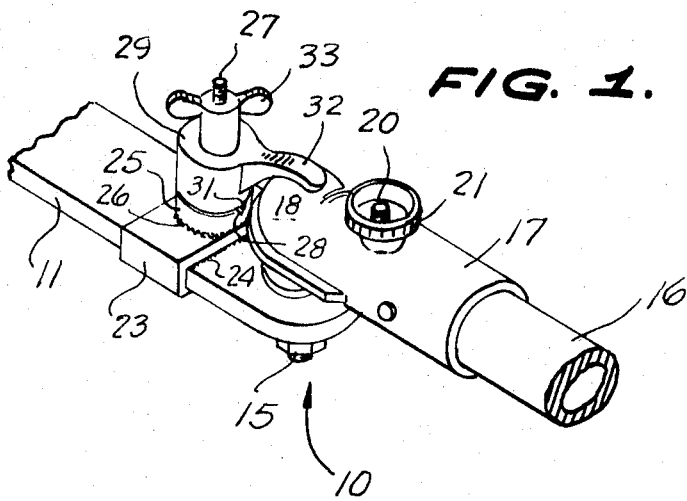
FIG. 1 is a perspective view of the invention.
Figure 2:
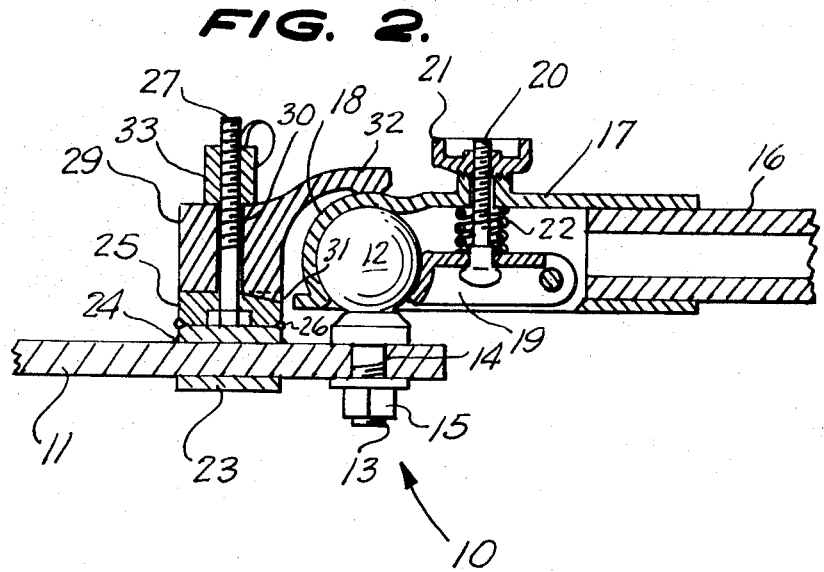
FIG. 2 is an enlarged fragmentary longitudinal sectional view of the structure illustrated in FIG. 1.

Referring now to the drawings in detail, wherein like reference characters indicate like parts throughout the several figures, the reference numeral 10 indicates generally a safety trailer hitch constructed in accordance with the invention.

The safety trailer hitch 10 includes a bar 11 attached to a towing vehicle (not shown) and having a ball 12 secured to the outer end thereof by means of a threaded shaft 13 extending through a bore 14 in the bar 11 and a nut 15 which is threaded onto the threaded shaft 13 and clamps the ball 12 tightly to the bar 11.

A generally cylindrical trailer tongue 16 has a coupling 17 rigidly secured to the forward end thereof. The coupling 17 includes a socket portion 18 which is adapted to engage over the ball 12 and a pivoted clamp member 19 which is adapted to be clamped against the ball 12 by means of a bolt 20, hand wheel 21, and compression spring 22. The bolt 20 extends upwardly through the clamp member 19 and through the top of the coupling 17 to receive the hand wheel 21 which is used to loosen or tighten the clamping member 19 under the ball 12. The ball 12 and coupling 17 described above are conventional in construction and may be any conventional ball and coupling other than the specific coupling illustrated.

A bracket 23 is engaged over the bar 11 forwardly of the ball 12 and is welded to the bar 11 at 24. A cylindrical boss 25 is welded at 26 to the bracket 23 with a bolt 27 extending perpendicularly upwardly therefrom. The boss 25 has a V shaped notch 28 formed in one side thereof for reasons to be assigned.

A generally cylindrical member 29 has an axial bore 30 which is engaged over the bolt 27 and has a V shaped detent 31 in its lower face which is adapted to engage in the V shaped groove 28 of the boss 25. A finger 32 extends radially outwardly from the member 29 terminating at a point centrally of the ball 12 overlying the socket 18 of the coupling 17. A wing nut 33 is threaded onto the bolt 27 to clamp the cylindrical member 29 against the boss 25 with the detent 31 in the notch 28. With the cylindrical member 29 in this position the finger 32 overlies the socket 18 and will prevent the coupling 17 from becoming disengaged from the ball 12 should the clamp member 19 fail or become disengaged.

When coupling or uncoupling the hitch 10 the wing nut 33 is loosened and the member 29 is rotated to move the finger 32 to a position away from the ball 12 to thus permit the coupling 17 to be disengaged from the ball 12.

Referring now to FIGS. 3 through 5 a modified safety trailer hitch is indicated generally at 50. The trailer hitch 50 includes a channel tow bar 51 secured to the towing vehicle (not shown). A ball 52 is secured to the tow bar 51 by means of a bolt 53 which extends therethrough and a nut 54. A washer 55 is mounted beneath the ball 52 and has an annular flange 56 extending radially outwardly therefrom in spaced apart relation with respect to the channel 51.

A housing generally indicated at 57 has a horizontal bottom wall 58 which is provided with a central bore 59 to permit the bottom wall 58 to pivot on the washer 55 while resting on the tow bar 51.

The bottom wall 58 of the housing 57 has a pair of upstanding side walls 60, 61 integrally secured thereto and arranged in spaced apart generally parallel relation. The side walls 60, 61 are connected by relatively low front and rear walls 62, 63 respectively to complete the housing.

A trailer tongue 64 is provided with a coupling 65 having a socket 66 which is adapted to engage over the ball 52. A clamp member 67 is adapted to engage under the ball 52 in a conventional manner when the hand wheel 68 is adjusted on the coupling 65.

A U shaped yoke generally indicated at 69 has a leg 70 secured to the side wall 60 by a pivot bolt 71. A washer 72 is positioned between the leg 70 and the side wall 60 to permit the yoke 69 to swing freely. The yoke 69 has a second leg 73 connected to the side wall 61 by means of a pivot bolt 74. A washer 75 is positioned between the leg 73 and the side wall 61 to permit the leg 73 to swing freely with respect thereto. A bar 76 connects the legs 70, 73 as can be seen in FIG. 4.

The side wall 60 has an aperture 77 formed therein and the side wall 61 has an aperture 78 formed therein. The apertures 77, 78 generally overlie the pivot bolts 71, 74. A spring arm 79 is secured to the leg 73 by means of the pivot bolt 74 and a rivet 80 and carries a latch pin 81 which extends through an aperture 82 in the leg 73 and is adapted to engage in the aperture 78 as illustrated in FIG. 4 to lock the yoke 69 in an erect position with the bar 76 overlying the socket 66 to thus prevent the coupling 65 from becoming disengaged from the ball 52. The upper end of the arm 79 is reverted at 83 to form a finger grip for pulling the arm 79 outwardly to release the latch pin 81 from the aperture 78 to permit the yoke 69 to be swung to a position out from over top the ball 52 to permit the coupling 65 to be engaged and disengaged at will.

The arm 79 is formed of spring material so that the latch pin 81 is normally urged into seated engagement with the aperture 78.

Having thus described the preferred embodiments of the invention it should be understood that numerous structural modifications and adaptations may be resorted to without departing from the spirit of the invention.

What is claimed is:

1. In a safety trailer hitch of the type which includes a tow bar mounted on the towing vehicle carrying a ball and a tongue mounted on the trailing vehicle carrying a coupling for releasably clamping on the ball, the improvement comprising a housing mounted on the tow bar and having the ball positioned therein, a U-shaped yoke secured to said housing at opposite ends thereof on a horizontally extending pivot for pivotal movement to a position overlying the coupling, and means for releasably latching said yoke in its coupling overlying position to prevent the disengagement of the coupling from the ball.

2. A safety trailer hitch as claimed in claim 1, wherein the means for releasably latching the yoke includes a spring pressed latch pin on said yoke cooperating with an aperture in said housing to latch said yoke in erect position overlying said coupling.

3. A safety trailer hitch as claimed in claim 1, wherein said housing is pivotally mounted on the tow bar for rotation about a vertical axis passing through the ball to align said housing with said coupling.

* * * * *